United States Patent [19]
Rossi

[11] Patent Number: 6,152,502
[45] Date of Patent: Nov. 28, 2000

[54] APPARATUS FOR CLOSING A REAR COMPARTMENT DOOR OF A VEHICLE

[76] Inventor: Patricia L. Rossi, 43473 Golden Meadow, Cir., Ashburn, Va. 20147-5426

[21] Appl. No.: 09/399,251

[22] Filed: Sep. 20, 1999

[51] Int. Cl.⁷ .................................................... E05B 1/00
[52] U.S. Cl. .................................. 292/347; 292/DIG. 31; 292/DIG. 36; 292/DIG. 43; 296/56
[58] Field of Search .................. 292/254, 336.3, 292/347, DIG. 31, DIG. 36, DIG. 43; 296/56, 76, 106, 146.8; 16/412, 442

[56] References Cited

U.S. PATENT DOCUMENTS

| | | | |
|---|---|---|---|
| 1,437,205 | 11/1922 | Sheffield | 160/133 |
| 2,224,371 | 12/1940 | Witchger | 296/146.1 |
| 2,610,084 | 9/1952 | Anderson | 49/460 |
| 2,894,777 | 7/1959 | Hogan | 191/113 |
| 2,973,561 | 3/1961 | Jackson | 52/69 |
| 3,148,913 | 9/1964 | Golde | 296/223 |
| 3,159,867 | 12/1964 | Aciego | 16/412 |
| 3,234,583 | 2/1966 | Kempel | 16/412 |
| 3,910,625 | 10/1975 | Menard | 292/37 |
| 3,971,589 | 7/1976 | Elrod | 296/76 |
| 4,188,061 | 2/1980 | Shehi | 296/76 |
| 4,580,821 | 4/1986 | Genord | 292/336.3 |
| 4,688,844 | 8/1987 | Hirose | 296/76 |
| 5,369,970 | 12/1994 | Voiculescu | 70/240 |

*Primary Examiner*—B. Dayoan
*Assistant Examiner*—Gary Estremisky
*Attorney, Agent, or Firm*—Rossi & Associates

[57] ABSTRACT

The invention provides an apparatus for closing a compartment door of a vehicle that enables individuals of small stature to close the door without difficulty. More specifically, the apparatus includes an extension handle that extends below a lip of the fully opened compartment door, thereby enabling an individual of small stature to reach and pull down on the extension handle to close the compartment door. In a preferred embodiment, the extension handle includes a pivot mounting and an extension arm coupled to the pivot mounting. A latching mechanism latches the extension handle in a stowed position in which the extension handle is preferably flush with an inner surface of the compartment door. The extension handle can also be made to deploy from a lip of the compartment door. Alternatively, the extension handle includes a retractable lanyard coupled to a grip.

8 Claims, 5 Drawing Sheets

APPARATUS FOR CLOSING A REAR COMPARTMENT DOOR OF A VEHICLE

FIELD OF THE INVENTION

The present invention relates in general to an apparatus for closing a compartment door of a vehicle. More specifically, the invention relates to an apparatus for closing a rear compartment door of a vehicle, commonly referred to as a "trunk lid" or "hatch", which includes an extension handle that extends below a lip of the compartment door when opened, thereby enabling individuals of small stature to easily close the compartment door.

BACKGROUND OF THE INVENTION

Individuals of small stature, also referred to as height impaired individuals or—more generally—as short people, can have a difficult time when attempting to close the trunk lid or hatch of a vehicle. Vehicle manufactures commonly use gas struts or springs to lift a vehicle's trunk lid or hatch to a fully open position. In order to facilitate the loading of cargo in the trunk compartment or hatchback compartment, it is generally preferable to have the trunk lid or hatch open as high as possible. Individuals of small stature, particularly those of heights of less than five feet four inches, find it difficult to reach a fully opened trunk lid or hatch in a manner sufficient to provide them with enough leverage to close the lid against the significant counter forced asserted by the gas struts or springs.

In view of the above, it is an object of the invention to provide an apparatus for closing a rear compartment door of a vehicle that enable individuals of small stature to easily close the compartment door.

SUMMARY OF THE INVENTION

The invention provides an apparatus for closing a compartment door of a vehicle that enables individuals of small stature to close the door without difficulty. More specifically, the apparatus includes an extension handle that extends below a lip of the fully opened compartment door, thereby enabling an individual of small stature to reach and pull down on the extension handle to close the compartment door. In a preferred embodiment, the extension handle includes a pivot mounting and an extension arm coupled to the pivot mounting. A grip is preferably coupled to the extension arm. A latching mechanism latches the extension handle in a stowed position in which the extension handle is preferably flush with an inner surface of the compartment door. Upon release of the latching mechanism, the extension handle is lowered downward to a position within easy reach of small individuals, either by the force of gravity or through mechanical assistance. The extension handle can also be made to deploy from a lip of the compartment door. Still further, the extension handle can include a grip that is coupled to a tether, such that the grip is lowered on the tether upon release of a latching mechanism.

Other advantages and features of the invention will become apparent to those of ordinary skill in the art after review of the following detailed description of the preferred embodiments of the invention and the accompanying drawings.

BRIEF DESCRIPTION OF THE DRAWINGS

The invention will be described in detail with reference to certain preferred embodiments thereof and the accompanying drawings, wherein.

BRIEF DESCRIPTION OF THE PREFERRED EMBODIMENTS OF THE INVENTION

Figure 1:
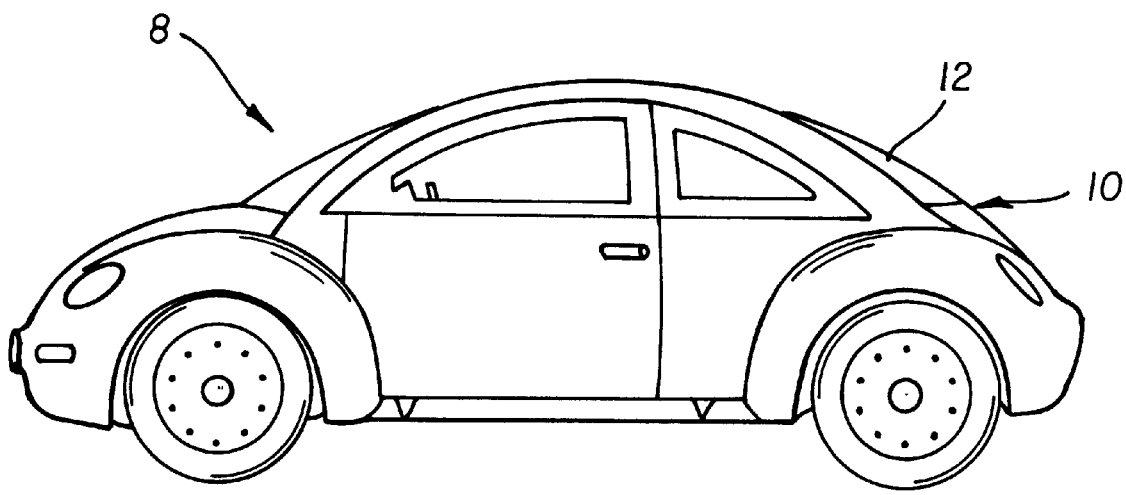
FIG. 1 is a side view of a hatchback style vehicle including a rear compartment door incorporating the present invention.
Figure 2:
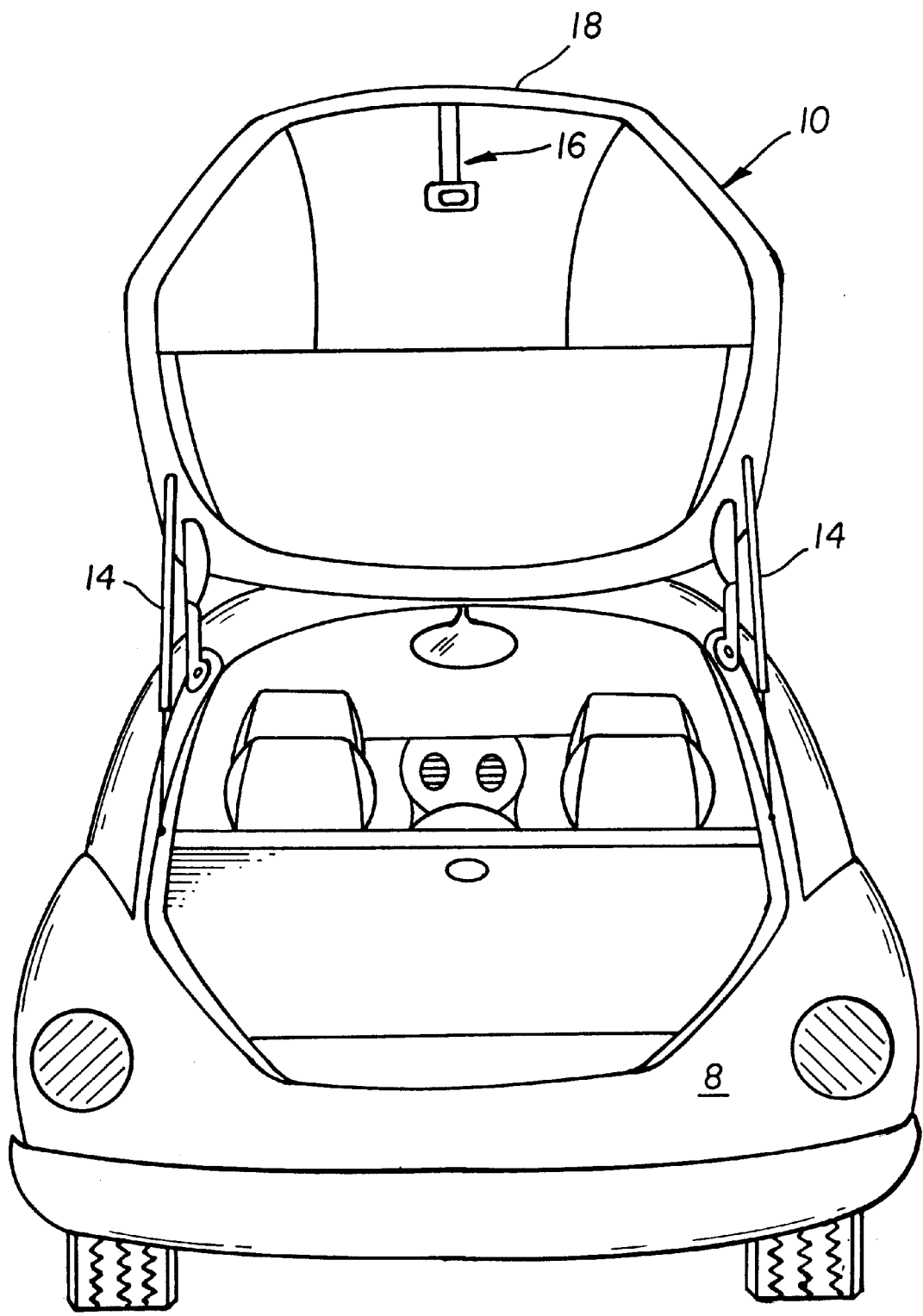
FIG. 2 is a rear view of the opened rear compartment door of the hatchback style vehicle illustrated in FIG. 1.

FIG. 1 is a side view of a hatchback style vehicle 8 that includes a rear compartment door 10. In the illustrated embodiment, the rear compartment door 10 includes a window 12 and is commonly known as a "hatch". As illustrated in FIG. 2, the rear compartment door 10 is supported by gas struts 14 that lift the compartment door 10 in a conventional manner to a fully opened position. While a hatchback style vehicle 8 will be utilized to illustrate the invention, it will be understood that the invention is applicable to any compartment door of any type of vehicle that opens in a vertical direction. An extension handle 16 is preferably located on the rear compartment door 10, such that the extension handle 16 extends downward past a rear lip 18 when the compartment door 10 is fully opened, thereby enabling an individual of small stature to pull the compartment door 10 downward using the extension handle 16.

Figure 3:
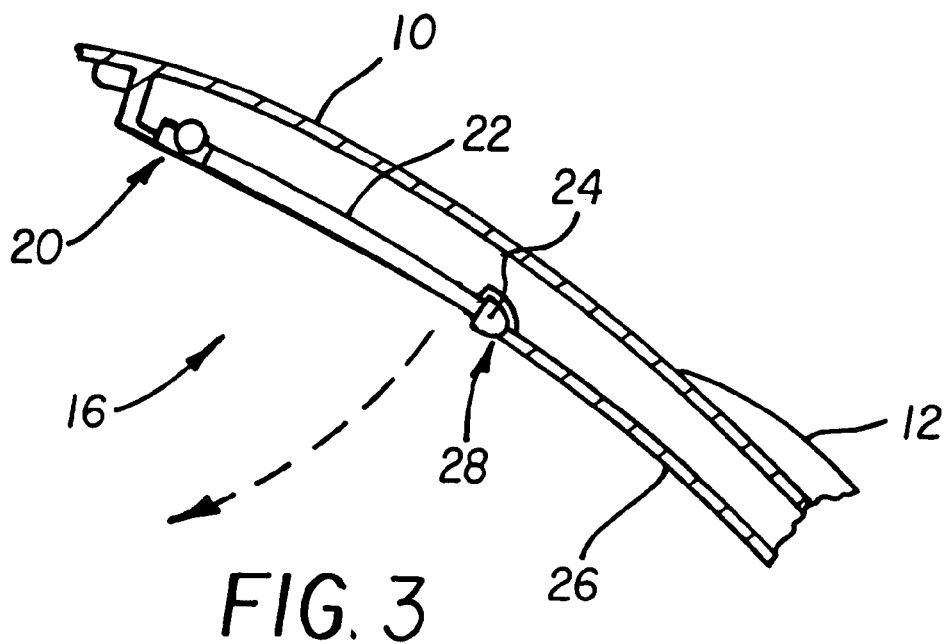
FIG. 3 is a cross-sectional view of the rear compartment door illustrating a first embodiment of the invention of an extension handle locked in a stowed position.
Figure 4:
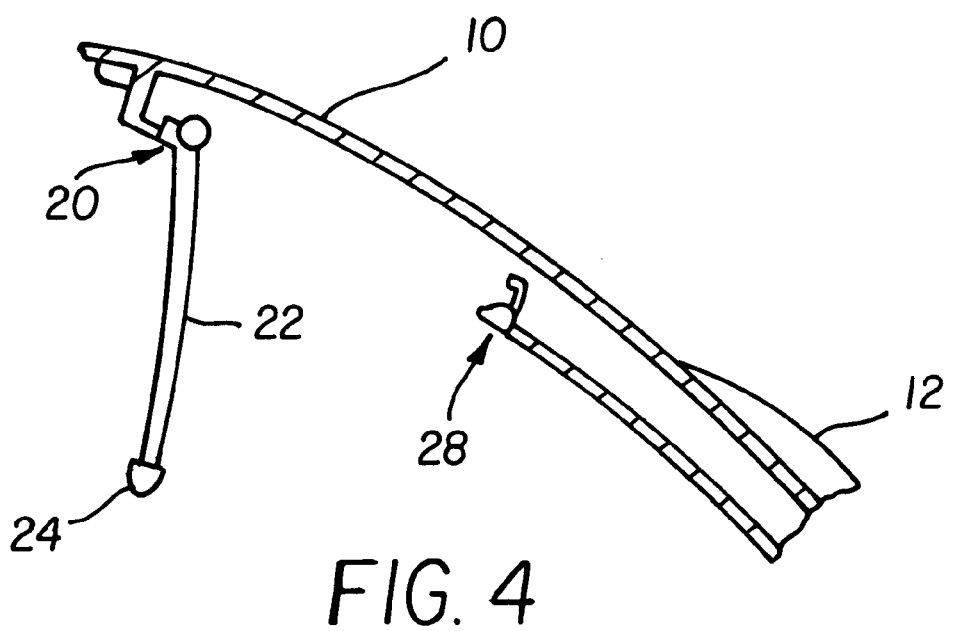
FIG. 4 is a side cross-sectional view of the rear compartment door illustrated in FIG. 3 with the extension handle extended for use by a vehicle operator.

As shown in FIG. 3, the extension handle 16 preferably includes a spring loaded pivot mounting 20, an extension arm 22 and a grip 24. The extension arm 22 is preferably shaped to fit flush with an inner surface 26 of the rear compartment door 10 when the extension handle 16 is in a stowed position as illustrated. A latching mechanism 28 is provided to latch the extension handle 16 in the stowed position, and is preferably electrically operated to release the extension handle 16 when the hatch is opened. The latching mechanism 28, for example, is preferably operated simultaneously with a vehicle's electrical hatch release or is activated upon the turning of a key in a vehicle's hatch lock. Once released, the extension handle 16 moves into a lowered position as illustrated in FIG. 4 under the force exerted by the spring loaded pivot mounting 20, thereby enabling an individual of small stature to reach the grip 24 and pull down on the extension handle 16 to lower the rear compartment door 10. When the individual can firmly grip the lip 18 of the rear compartment door 10, the extension handle 16 is flipped back into the stowed position and latched by the latching mechanism 28.

As will be readily recognized by those of skill in the art, many variations of the inventive closing apparatus are possible. For example, the grip 24 can be formed in any desired shape including a conventional encircled grip shape illustrated or a "T" shaped handle. Still further, the grip 24 need not be employed and the individual can simply pull on the extension arm 22 or the grip 24 can be formed integral with the extension arm 22 as one piece. In addition, any desired type of latching mechanism may be employed including those operated by non-electrical means (such as a pulled cable) or mechanical detents that simply hold the extension arm 22 in place. If mechanical detents are utilized, the individual will be required to manually release the extension arm 22 prior to allowing the compartment door 10 to fully open. Still further, although it is preferable to utilize a mechanical force such as that supplied by the spring loaded pivot mounting, the extension arm 16 can simply by allowed to fall into place under the force of gravity or may be electrically driven by a motorized mechanism.

Figure 5:
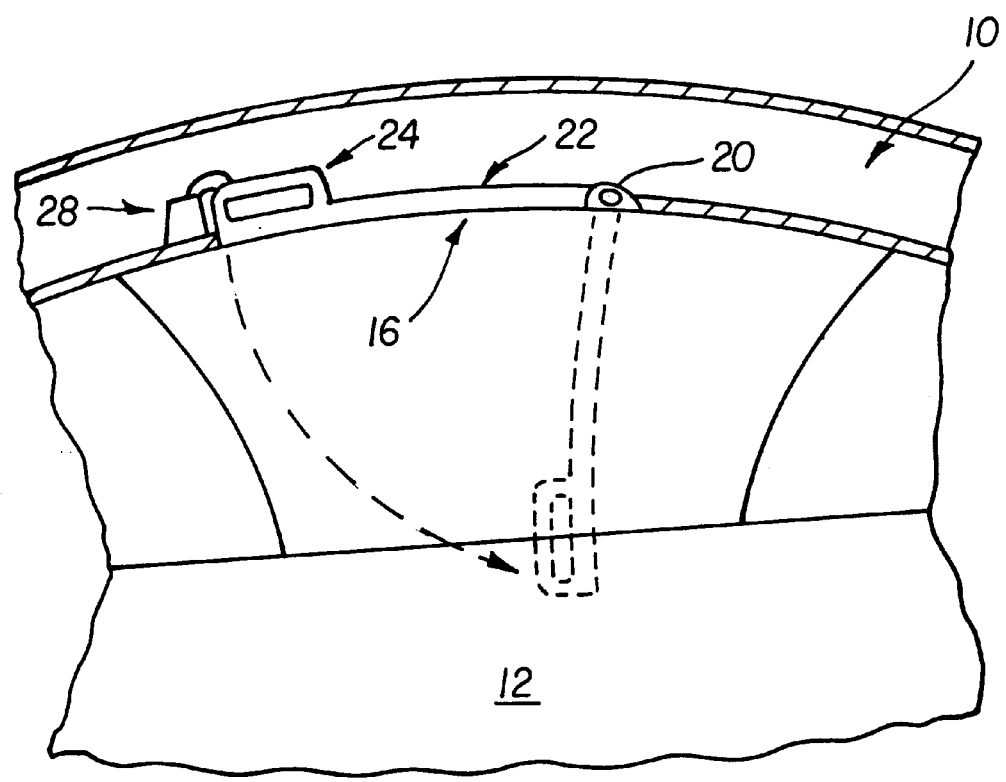
FIG. 5 is an end cross-sectional view of a lip portion of the rear compartment door illustrating a second embodiment of the invention of an extension handle locked in a stowed position and extended.

A second embodiment of the invention is illustrated in FIG. 5. In the second embodiment, the extension handle 16 is located at the lip 18 of the rear compartment door 10, such that the extension arm 22 extends in an arc across the opening of the rear compartment door 10 as shown in phantom. This differs from the first embodiment in which the extension arm 22 extends in an arc outward of the opening of the rear compartment door 10 toward the person opening the door. The configuration of the second embodiment is particularly well suited for applications related to a regular trunk lid, in which it would be preferable to have the extension arm 22 extend from the lip of the truck lid as opposed to opening outward from an inner surface thereof.

Figure 6:
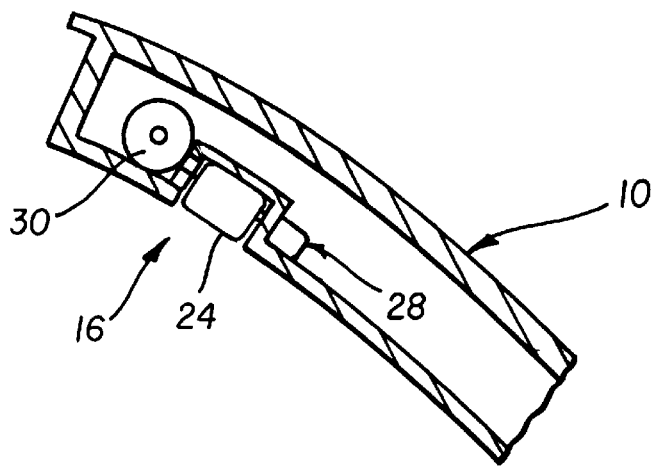
FIG. 6 is a side cross-sectional view of the rear compartment door illustrating a third embodiment of the invention with an extension handle in the stowed position.
Figure 7:
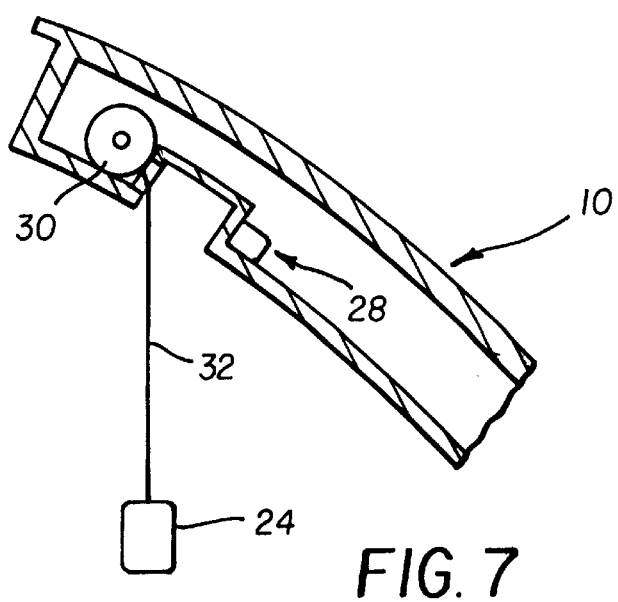
FIG. 7 is a side cross-sectional view of the rear compartment door illustrating a third embodiment of the invention with an extension handle in the extended position.

The invention has been described with reference to certain preferred embodiments thereof. It will be understood, however, that modifications and variations are possible within the scope of the appended claims. The extension handle 16 need not be required to include a rigid extension handle 22, but may simply include a lanyard that can be pulled by the vehicle operator. In the embodiment illustrated in FIG. 6, the extension handle 16 includes a grip 24 that is coupled to a reel 30 by a cord 32. In the stowed position, the grip 24 is locked in place by the locking mechanism 28. When released, the grip 24 falls out of the rear compartment door 10 as the cord 32 unreels from the reel 30. Once the operator pulls the rear compartment door 10 down by the grip 24, the cord 32 is retracted by the reel 30 either through electrical operation or through mechanical operation, namely, the reel 30 can either be driven by an electrical motor or can include a spring loaded mechanism (like a window shade) to retract the cord 32. The cord 32 may be manufactured of any type of material including a single strand or multiply wound strands of natural or synthetic fibers. Further, a flat strap or other shaped material may be utilized for the cord 32.

What is claimed is:

1. An automobile having a passenger compartment and a rear storage compartment, said automobile comprising:

a rear storage compartment door that can be moved vertically in an upward direction from a closed position to a fully open position to allow access to the rear storage compartment from the exterior of the automobile, said rear storage compartment door including an exterior surface and an interior surface; and an extension handle, mounted to the rear storage compartment door, that can be moved vertically in a downward direction from a stowed position to an extended position;

wherein an end of the extension handle extends vertically downward past a rear lip of the rear storage compartment door when the rear storage compartment door is in the open position and the extension handle is in the extended position, such that a first vertical reach distance to the end of the extension handle is less than a second vertical reach distance to the rear lip of the rear storage compartment door; and wherein the extension handle is substantially flush with the interior surface of the rear storage compartment door when the extension handle is located in the stowed position.

2. An automobile as claimed in claim 1, wherein the extension handle includes a pivot mounting and an extension arm coupled to the pivot mounting.

3. An automobile as claimed in claim 2, wherein the extension handle includes a grip coupled to the extension arm.

4. An automobile as claimed in claim 1, further comprising a latching mechanism that latches the extension handle in the stowed position.

5. An automobile as claimed in claim 1, wherein the extension handle is located at the rear lip of the storage compartment door and is also flush with the rear lip of the rear storage compartment door when in the stowed position.

6. An automobile as claimed in claim 1, further comprising means for applying an extension force to the extension handle in order to move the extension handle from the stowed position to the extended position.

7. An automobile as claimed in claim 2, wherein the pivot mounting is spring loaded to apply a force to the extension arm.

8. An automobile as claimed in claim 2, wherein the extension arm includes an integral grip.

* * * * *